United States Patent [19]
Michael

[11] 3,982,603
[45] Sept. 28, 1976

[54] STEERING SYSTEMS FOR GUIDED VEHICLES

[75] Inventor: Robert Michael, Paris, France

[73] Assignee: Transports-Recherches-Etudes et Groupement d'Interet Economique (TREGIE), Rueil-Malmaison, France

[22] Filed: Sept. 8, 1975

[21] Appl. No.: 611,579

[30] Foreign Application Priority Data
Sept. 13, 1974 France .............................. 74.31111

[52] U.S. Cl. .............................. 180/131; 104/244.1; 280/87.2
[51] Int. Cl.² .......................................... B62D 5/06
[58] Field of Search ............ 180/79, 131, 140, 77 S; 280/87.2, 91; 104/244.1, 247; 74/479

[56] References Cited
UNITED STATES PATENTS
1,866,393  7/1932  Brooks .................................. 280/91

FOREIGN PATENTS OR APPLICATIONS
100,939  4/1962  Netherlands ....................... 180/131
1,202,490  8/1970  United Kingdom ................. 180/131

*Primary Examiner*—M. H. Wood, Jr.
*Assistant Examiner*—John A. Pekar
*Attorney, Agent, or Firm*—Beveridge, DeGrandi, Kline & Lunsford

[57] ABSTRACT

A steering system for a guided vehicle comprises a coupling device for coupling the steering axle actuating linkage both to a detector for guiding the vehicle along a guidance reference member and to a steering gear, the coupling device comprising first and second elements respectively mechanically linked to the steering gear and the detector and mounted for movement along first and second guide bars, each element being movable between first and second positions on its guide bar, the guide bars being so coupled to the actuating linkage that an element in the first position transmits movement to the actuating linkage and in the second position is ineffective to transmit such movement.

4 Claims, 3 Drawing Figures

U.S. Patent    Sept. 28, 1976    Sheet 2 of 2    3,982,603
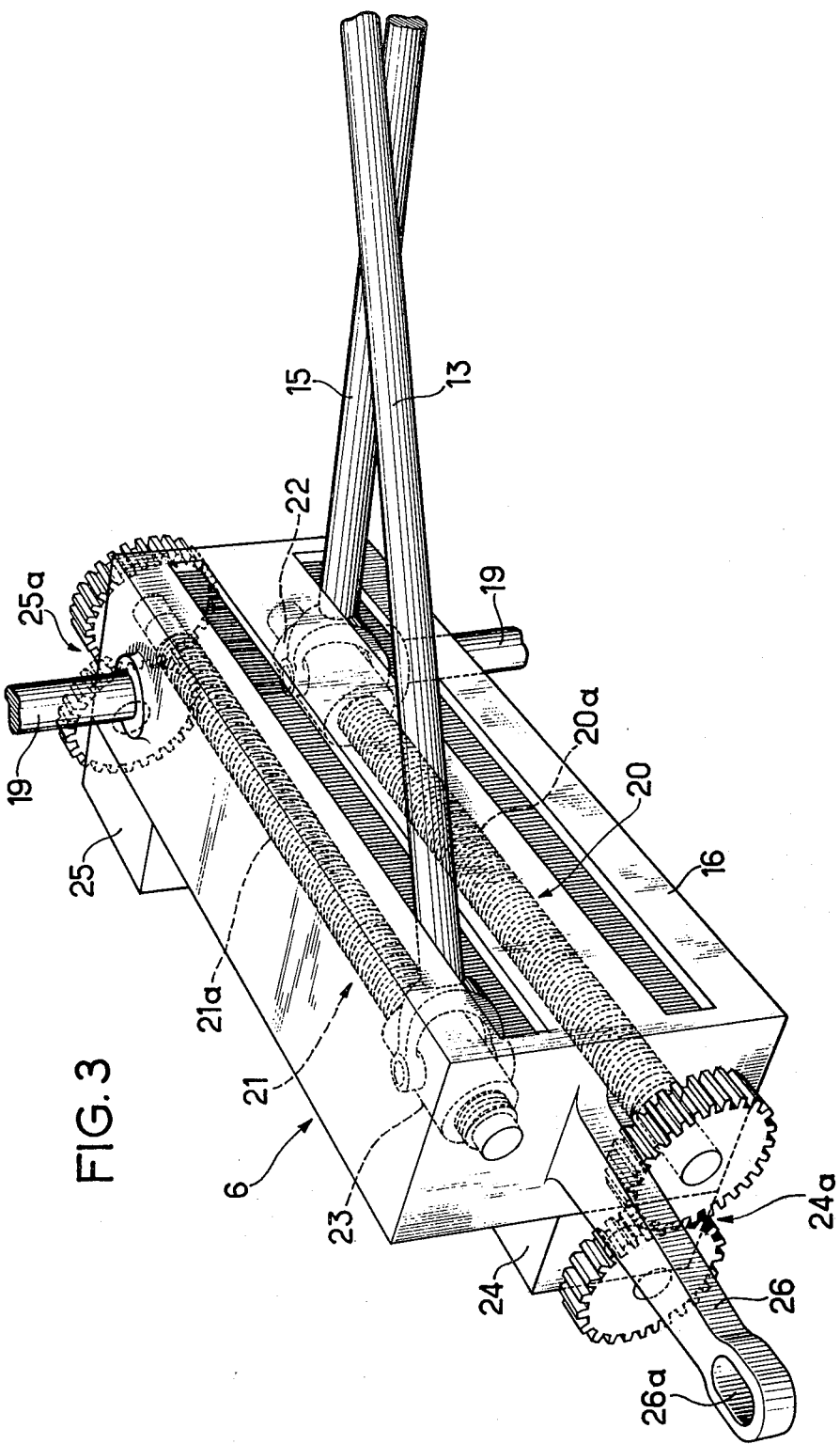

STEERING SYSTEMS FOR GUIDED VEHICLES

This invention relates to a control device for a steering axle of a vehicle capable of being guided along a track provided with a guiding reference member.

In the known control devices, information corresponding to the position of a detector with respect to a guiding reference member is transmitted by means of a servo control to an actuating linkage for a steering axle.

For vehicles capable of movement along tracks with or without guiding reference members, the actuating linkage must be able to be controlled from the detector and/or from the steering gear according to whether the vehicle is running on a site with a guiding reference member, or is running on a site without a guiding reference member or is in transit from one site to the other. However, in the known control devices it is not possible to connect the conventional steering gear and the said detector to a single actuating linkage, simultaneously or individually as desired.

The present invention has for its object to provide a control device which permits at will a control of the said axle either by a detector or by a conventional steering mechanism according to whether the vehicle moves along the guiding reference member or along a track without a guiding reference member.

According to the present invention, a vehicle having a detector for guiding the vehicle along a guidance reference member mounted on a track and having a steering gear and an actuating linkage for guiding a steering axle in accordance with operation of the steering gear, further includes a coupling device for coupling the steering gear and the detector to the actuating linkage, the coupling device comprising a member mounted for rotation about a first axis and connected to the actuating linkage to move the actuating linkage in accordance with its rotation about the said first axis; first and second guide bars each connected to the said member and each mounted transversely with respect to said first axis and with its axis passing through the said first axis; and first and second elements mounted for movement along the first and second guide bars and mechanically linked to the steering gear and the detector, respectively, the steering gear and detector constituting input devices for the said coupling device, each of the elements being movable along its guide bar between a first position remote from the said first axis, in which position displacement of the said element transversely to the direction of the guide bar by its input device is effective to rotate the said member about the said first axis, and a second position on the said first axis, in which position the said element is ineffective to rotate the member about said first axis.

Thus, either the steering gear or the detector can be "neutralised" (i.e., rendered ineffective) very simply and progressively through the continuous movement of the movable element to which it is connected along the guide bar to a position on the said first axis. In the preferred form of coupling device, the guide bars are threaded lead screws and the movable elements are nuts which can be moved along the lead screws by rotation of the latter. Each nut can be moved along its lead screw independently of the other. The member mounted for rotation about the said first axis may be a housing containing the lead screws.

In order that the invention may be better understood, an example of a vehicle construction embodying the invention will now be described with reference to the accompanying drawings, in which:

FIG. 3 is a perspective view of the coupling device.

Figure 1:
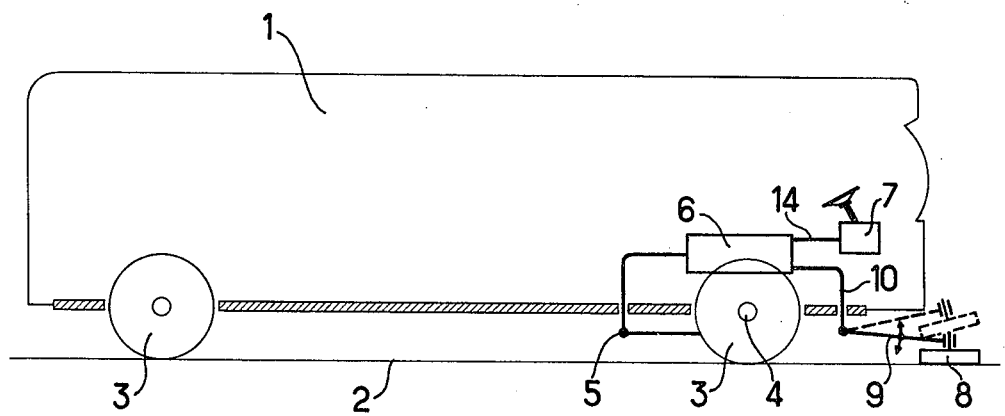
FIG. 1 is a schematic representation of a vehicle equipped with a device embodying the invention.

It will be seen from FIG. 1 that the guided vehicle 1 is travelling along a track 2 on conventional wheels 3 and that this vehicle comprises a forward axle 4 controlled by means of a linkage 5 connected to the output element of a coupling device 6, the input elements of which are respectively connected to a steering gear unit 7 and to a detector 8 for detecting the position of a guiding reference, not shown.

Figure 2:
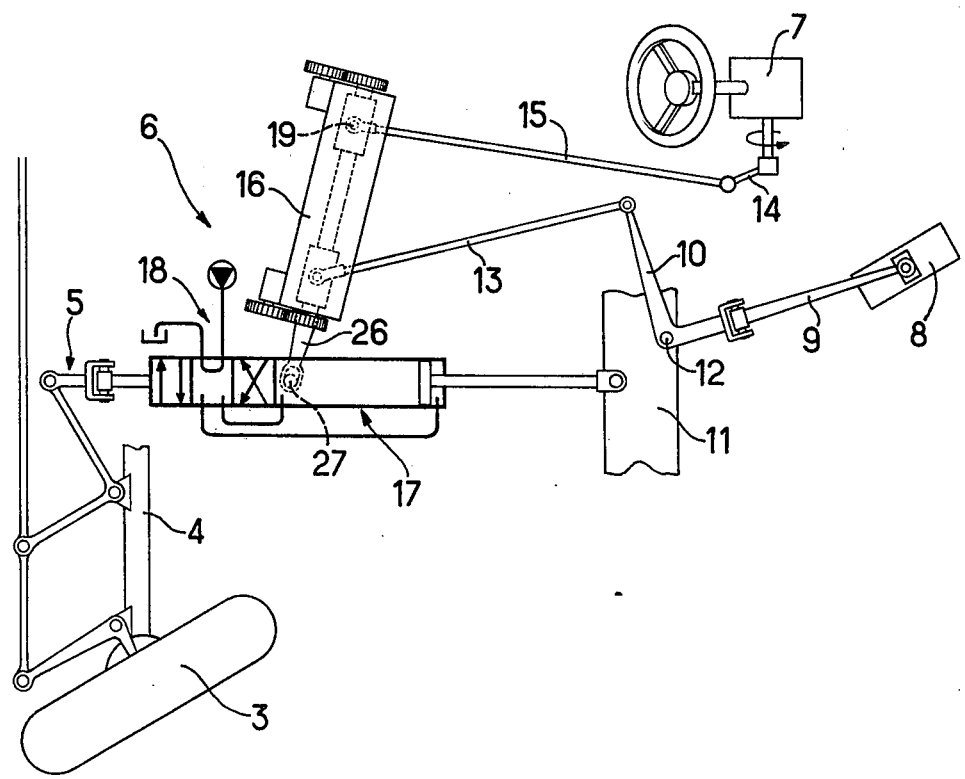
FIG. 2 is a diagrammatic view from above of the control device for the forward axle of the vehicle of FIG. 1.

The detector 8 is mounted for rotary movement on the end of a lifting arm 9 (see also FIG. 2) and this latter is articulated to the end of an elbow 10 mounted on a cross-member 11 of the chassis of the vehicle for pivotal movement about an axis 12. A rod 13 (FIGS. 2 and 3) which constitutes a first of the input elements of the coupling device 6 is pivotally connected to the end of the arm 10.

The displacements of the detector 8 are translated into a force exerted on the coupling device 6.

In a similar manner, the output shaft 14 of the steering gear unit 7 exerts a pushing or pulling force on a rod 15 which constitutes the second of the input elements of the coupling device 6.

To this end, the coupling device 6 comprises a device 16 which may be connected to the actuating linkage 5 directly or (as in FIG. 3) through the intermediary of a double-acting hydraulic actuator 17 controlled by a mechanically-controlled hydraulic distributor 18. The device 16 is additionally mounted for rotation about a vertical supporting axis 19 fixed to an element of the chassis of the vehicle 1.

In the device 16, there are provided a first guide bar 20 and a second guide bar 21 in the form of lead screws having threads 20a and 21a the axes of which pass respectively through the axis of the shaft 19. A first movable member 22 and a second movable member 23 in the form of nuts are displaceable along the lead screws 20 and 21, the lead screws being driven by driving elements 24 and 25 through gearing 24a and 25a. The driving elements 24 and 25 can be hydraulic or electric motors, for example.

The connection of the device 16 to the actuating linkage 5 is effected by means of a tail bar 26 provided with an oblong hole 26a co-operating with a pin 27 provided on the body of the hydraulic actuator 17.

When the vehicle is automatically guided along a guiding reference member, the detector 8 is in its lowered position, that is to say in contact with the guiding reference member. The elements of the coupling device occupy the positions shown in FIG. 3 with the movable element 23 in a position remote from the supporting shaft 19 and the movable element 22 in a position on the axis of the supporting shaft 19. The steering gear 7 is then neutralised, i.e., ineffective, since the second rod 15 exerts no rotational couple on the body 16. On the contrary, movement of the rod 13 results in movement of the forward axle 4, through the intermediary of the jack 17 and the distributor 18.

When the vehicle moves on a conventional track, the detector 8 is raised and the movable element 23 is brought to a position substantially aligned with the axis of the supporting shaft 19. The movable element 22 is moved to a position remote from the supporting shaft 19. In this position, the use of the steering wheel operates the distributor 18 and the actuating linkage 5, while the rod 13 and the raised detector 8 exert no rotational couple on the body 16.

Thus a positive link is maintained between the input and output elements of the coupling whatever the selected mode of control of the actuating linkage.

It will be understood that various changes can be made to the embodiment which has just been described. As an example, it is possible to replace the two motors 24 and 25 by a single motor with gearing adapted to cause inverse movements of the nuts guided along the lead screws 20 and 21.

I claim:

1. In a vehicle having a detector for guiding the vehicle along a guidance reference member mounted on a track and further having a steering gear and an actuating linkage for guiding a steering axle in accordance with operation of the steering gear, the improvement comprising a coupling device for coupling the steering gear and the detector to the actuating linkage, the coupling device comprising:

a member mounted for rotation about a first axis and connected to the actuating linkage to move the actuating linkage in accordance with its rotation about the said first axis;

first and second guide bars each connected to the said member and each mounted transversely with respect to said first axis and with its axis passing through the said first axis;

and first and second elements mounted for movement along the first and second guide bars and mechanically linked to the steering gear and the detector, respectively, the steering gear and detector constituting input devices for the said coupling device, each of the elements being movable along its guide bar between a first position remote from the said first axis, in which position displacement of the said element transversely to the direction of the guide bars by its input device is effective to rotate the said member about the said first axis, and a second position on the said first axis, in which position the said element is ineffective to rotate the member about said first axis.

2. A vehicle as defined in claim 1, in which at least one of the said guide bars is a threaded lead screw and the movable element mounted thereon is a nut movable along the said lead screw by rotation of the latter.

3. A vehicle as defined in claim 2, in which the said member mounted for rotation about the said first axis is a housing in which the two guide bars are mounted.

4. A vehicle as defined in claim 1, in which the said member is connected to the actuating linkage through a hydraulic actuator.

* * * * *